United States Patent
Nakanishi et al.

[15] 3,678,077
[45] July 18, 1972

[54] 9-OXOXANTHEN-2-YL-ALKANOIC ACIDS

[72] Inventors: Michio Nakanishi, 756 Shinborimachi, Nakatsu, Oita; Takanori Oe, 1336, Oaza-Hirotsu, Yoshitomimachi, Chikujogun, Fukuoka; Yutaka Maruyama, 3-12-3, Wada, Suginami-ku, Tokyo, all of Japan

[22] Filed: March 27, 1970

[21] Appl. No.: 23,458

[30] Foreign Application Priority Data

March 29, 1969 Japan....................................44/24050

[52] U.S. Cl..........................260/335, 424/278, 260/247.7 F, 260/268 TR
[51] Int. Cl. .........................................................C07d 7/44
[58] Field of Search..................................260/335

[56] References Cited

OTHER PUBLICATIONS

Chemical Abstracts, Vol. 31 (1937) p. 66565.

*Primary Examiner*—Norma S. Milestone
*Attorney*—Sughrue, Rothwell, Mion, Zinn & Macpeak

[57] ABSTRACT

2-arylalkanoic acids of the formula

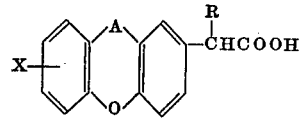

wherein A id CO or $CH_2$, R is H or lower alkyl and X is H, lower alkyl or halogen are analgesics, antirheumatics and anti-inflammatory agents.

4 Claims, No Drawings

9-OXOXANTHEN-2-YL-ALKANOIC ACIDS

This invention relates to novel and therapeutically valuable 2-arylalkanoic acids.

The novel 2-arylalkanoic acids of the present invention are compounds of the formula

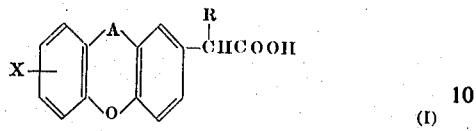

(I)

wherein A is CO or $CH_2$, R is H or lower alkyl (e.g. $CH_3$, $C_2H_5$) and X is H, lower alkyl (e.g. $CH_3$, $C_2H_5$) or halogen (e.g. F, Cl), and pharmaceutically acceptable, acid-addition salts thereof. The 2-arylalkanoic acids of formula (I) and pharmaceutically acceptable, acid-addition salts thereof are useful, for example, as analgesics, antirheumatics and anti-inflammatory agents.

The invention also provides methods for preparing such novel and useful 2-arylalkanoic acids and salts thereof.

In accordance with the present invention, the compounds may be prepared by any of the following methods, wherein A, R and X are as set forth above:

i. by hydrolysis of compounds of the formula

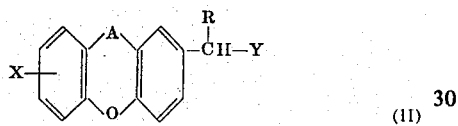

(II)

wherein Y is CN, $CONH_2$, COOR′ (R′ being lower alkyl or any other functional group that is hydrolyzable into COOH);

ii. by hydrolysis of amides or thioamides prepared by the Willgerodt-Kindler reaction from a compound of the formula

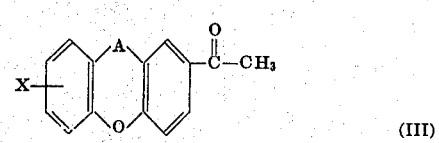

(III)

iii. by ring closure of a compound of the formula

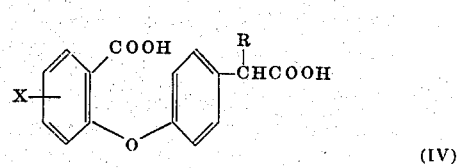

(IV)

The hydrolysis of methods (i) and (ii) may be carried out in a solvent (e.g., water, aqueous methanol, aqueous dioxane) in the presence of an acid (e.g., sulfuric acid, hydrochloric acid) or an alkali (e.g., sodium hydroxide, potassium hydroxide) under reflux.

The Willgerodt-Kindler reaction of method (ii) may be advantageously carried out with sulfur and morpholine at the reflux temperature of morpholine for 10–20 hours.

The ring closure, i.e., condensation of method (iii) may be carried out in a solvent (e.g., benzene, nitrobenzene, dichloroethane, carbon disulfide) in the presence of a condensing agent (e.g., polyphosphoric acid, phosphoric anhydride, sulfuric acid, aluminum chloride, acetic anhydride, hydrochloric acid, boron trifluoride) at from about 20° to about 150°C.

Compounds of formula (I) wherein R is lower alkyl may also be prepared by conventional alkylation of compounds of formula (I) wherein R is H.

The compounds of formula (I) can be converted in a conventional manner into the corresponding acid-addition salts with various inorganic or organic bases, such as Na, K, Ca, Mg, Ag, ammonium, triethylamine, diethylamine, morpholine, piperazine and the like.

The compounds of formula (I) and pharmaceutically acceptable, acid-addition salts thereof have analgesic and anti-inflammatory actions as shown, for example, by the following tests; in which the alphabetical notations A to D represent the following compounds, respectively:

A: 9-oxoxanthen-2-yl-acetic acid
B: Aluminum salt of 9-oxoxanthen-2-yl-acetic acid
C: 2-(9-oxoxanthen-2-yl)-propionic acid
D: Xanthen-2-yl-acetic acid

ANTI-INFLAMMATORY ACTION (CARRAGEENIN EDEMA METHOD)

This test was performed essentially in accordance with the method described by Charles A. Winter et al in *Proceedings of the Society for Experimental Biology and Medicine*, Vol. 111, pp. 544–547 (1962). Thus, a 1percent aqueous solution of carrageenin (0.05 ml) was injected subcutaneously into the hind paw of Donryu rat (male, about 130 grams). The test compound was suspended in a 1percent aqueous polysorbate 80 solution and the suspension (5 ml./200 g. of body weight) was administered orally 1 hour before the injection of carrageenin. The volume of the paw was measured after 3 hours, and the increase of volume in percent as compared with controls was measured. The results are shown in Table I.

TABLE I

| Compound | Dose (mg/kg) per os | Inhibition (%) |
| --- | --- | --- |
| A | 25 | 32.7 |
|   | 50 | 41.6 |
|   | 100 | 50.6 |
| B | 25 | 26 |
|   | 50 | 40 |
|   | 100 | 44 |
| C | 50 | 23 |
|   | 100 | 30 |
| D | 50 | 31 |
|   | 100 | 46 |
| Metiadinic Acid | 50 | 12 |
|   | 100 | 20 |
|   | 250 | 21 |
| Aspirin | 100 | 19.2 |
|   | 250 | 48.4 |

ANALGESIC ACTION (CHEMICAL STIMULATION METHOD)

This test was performed in accordance with the method described by L. C. Hedershot et al. in *Journal of Pharmacology and Experimental Therapeutics*, Vol. 125, pp. 237–240 (1959). Thus, a 0.02 percent aqueous solution of benzoquinone (0.2 ml/20 g. of body weight) was injected intraperitoneally into the dd mouse (male, about 20 g.). The test compound was suspended in a 1 percent aqueous polysorbate 80 solution and the suspension (0.1 ml/10 g. of body weight) was administered orally one hour before the injection of benzoquinone. The $ED_{50}$ value was determined as the dose diminishing to 50percent the cumulative number of writhings for 30 minutes. The results are shown in Table II.

TABLE II

| Compound | $ED_{50}$ (mg/kg Body Weight) |
| --- | --- |
| A | 95 |
| B | 110 |
| C | 66 |
| D | 220 |
| Aspirin | 270 |

Acute toxicity ($LD_{50}$) of 9-oxoxanthen-2-yl-acetic acid is as follows:

TABLE III

| | $LD_{50}$ (mg/kg) | | |
| --- | --- | --- | --- |
| | Wister Rat | | dd Mouse |
| Route | Male | Female | Male |
| Oral | 1600 | 1650 | > 640 |
| Subcutaneous | 860 | 800 | > 320 |
| Intraperitoneal | 540 | 540 | > 320 |

In view of various tests, including those above, the compounds of formula (I) and their pharmaceutically acceptable, acid-addition salts can be administered safely to warm-blooded animals, for example, such as cats, dogs, sheep, cows, horses and the like, as antirheumatics, analgesics and anti-inflammatory agents per se or in the form of a pharmaceutical composition in admixture with a suitable and conventional carrier or adjuvant, administrable orally, percutaneously or by way of injection, without harm to the host.

The pharmaceutical composition can take the form of tablets, granules, powders, capsules, etc. for oral administration, of injectable solutions for subcutaneous or intramuscular administration, or of cream, ointments, jellies, suppositories, etc. for topical administration. The choice of carrier is determined by the preferred form of administration, the solubility of the compounds and standard pharmaceutical practice.

The following are examples of formulations of compounds of the invention which may be administered for pharmaceutical purposes.

A. 25 mg capsules are prepared from the following composition:

| | |
|---|---|
| Compound A | 50 mg. |
| lactose | 61 mg. |
| corn starch | 61 mg. |
| methylcellulose | 1.5 mg. |
| magnesium stearate | 1 mg. |

B. 50 mg capsules are prepared from the following composition:

| | |
|---|---|
| Compound B | 50 mg. |
| lactose | 83 mg. |
| corn starch | 83 mg. |
| methylcellulose | 2 mg. |
| magnesium stearate | 2 mg. |

C. 25 mg tablets are prepared from the following composition:

| | |
|---|---|
| Compound C | 25 mg. |
| lactose | 75.5 mg. |
| corn starch | 12 mg. |
| microcrystalline methylcellulose cellulose | 7 mg. 1.4 mg. |
| talc | 3.3 mg. |
| magnesium stearate | 0.7 mg. |

The usual daily dose of compound (I) or a salt thereof lies in the range of about 1 to 10, preferably about 4 to 8 mg/kg of body weight. Such dosages would correspond to about 75 to 700 milligrams, preferably about 300 to about 600 milligrams per day for a human adult.

The present invention is further explained by way of the following illustrative examples. It is to be noted that, in the following examples, the abbreviations "g.," "mg.," "kg." and "ml." represent "gram(s)," "milligram(s)," "kilogram(s)" and "milliliter(s)," respectively.

EXAMPLE 1

To a solution of 10 g. of sodium hydroxide in 100 ml. of ethanol plus 50 ml. of water, there is added 30 g. of 9-oxoxathen-2-yl-acetonitrile, and the mixture is refluxed for 8 hours. The ethanol is distilled off, the residue is dissolved in 500 ml. of water, the solution is treated with active carbon, and then hydrochloric acid is added to give 10 g. of 9-oxoxanthen-2-yl-acetic acid melting at 213° to 216°C. as crystals.

To a solution of 3.5 g. of 9-oxoxanthen-2-yl-acetic acid in 100 ml. of hot isopropanol is added a solution of 2.82 g. of aluminum isopropoxide in 30 ml. of isopropanol. After refluxing for an hour, the white crystals are collected and washed with isopropanol to give the aluminum salt of 9-oxoxanthen-2-yl-acetic acid melting at above 300°C.

EXAMPLE 2

To a solution of 5 g. of sodium hydroxide in 30 ml. of water and 70 ml. of ethanol, there is added 27 g. of ethyl 9-oxoxanthen-2-yl-acetate, and the mixture is refluxed for an hour. The ethanol is distilled off, and the resulting crystalline sodium salt is dissolved in about 200 ml. of water, the solution is treated with active carbon, and then hydrochloric acid is added to yield a precipitate, which is recrystallized from aqueous ethanol to give 20 g. of pale yellow crystals of 9-oxoxanthen-2-yl-acetic acid melting at 215° to 217°C.

EXAMPLE 3

A mixture of 3 g. p-(o-carboxyphenoxy)phenyl acetic acid and 30 g. of polyphosphoric acid is heated at 70°C. for 3 hours with stirring. The reaction mixture is poured into ice water, and the precipitate is collected, washed with water and recrystallized from aqueous dioxane to give 1.3 g. of white crystals of 9-oxoxanthen-2-yl-acetic acid melting at 217° to 219°C.

EXAMPLE 4

A mixture of 13 g. of 2-acetylxanthene, 3.2 g. of sulfur and 34 ml. of morpholine is refluxed in nitrogen atmosphere for 18 hours, about a half of the morpholine is distilled off, and then 100 ml. of ethanol is added to the residue to precipitate 8 g. of crude xanthen-2-yl-thioacetomorpholide.

A mixture of 2.5 g. of the crude xanthen-2-yl-thioacetomorpholide, 4 g. of potassium hydroxide and 50 ml. of ethanol is refluxed in nitrogen atmosphere for 16 hours. The ethanol is distilled off, the residue is dissolved in water, the solution is treated with active carbon, and then hydrochloric acid is added. The precipitate is recrystallized from ethyl acetate to give 0.7 g. xanthene-2-yl-acetic acid melting at 189° to 190°C.

EXAMPLE 5

A mixture of 7.5 g. of ethyl α-(9-oxoxanthen-2-yl)propionate 40 ml. of ethanol, 1.3 g. of sodium hydroxide and 10 ml. of water is heated at 60° to 270°C. for an hour. After concentration, the residue is dissolved in water, the solution is treated with active carbon, and then hydrochloric acid is added. The precipitate is recrystallized from aqueous ethanol to give 5.3 g. of α-(9-oxoxanthen-2-yl)propionic acid melting at 163° to 165°C.

EXAMPLE 6

Sodium amide is produced in situ from by 150 ml. of liquid ammonia and 1.6 g. of metallic sodium. To this is added 7.6 g. of 9-oxoxanthen-2-yl-acetic acid. After stirring the mixture for 30 minutes, a mixture of 4.3 g. methyl iodide and 20 ml. of ether is added dropwise over 30 minutes. Stirring is continued until the ammonia completely evaporates off, then water is added to the reaction mixture. The resulting mixture is treated with active carbon, and then hydrochloric acid is added. The precipitate is recrystallized from aqueous ethanol to give 2 g. of α-(9-oxoxanthen-2-yl)propionic acid melting at 163° to 165°C.

EXAMPLES 7 and 8

Following the procedures of Examples 1 to 6, but substituting equivalent amounts of appropriate starting materials, 8-methyl-9-oxoxanthen-2-yl-acetic acid melting at 217° to 219°C. and 6-chloro-9-oxoxanthen-2-yl-acetic acid melting at 239° to 241 C. are produced.

Specific examples of the preparation of the starting materials of formula (II), (III) and (IV), for example, are given below:

EXAMPLE 9

Preparation of Compound of Formula (II)

a. To a solution of 25 g. of potassium cyanide in 100 ml. of water, there are added 93 g. of 2-bromomethyl-9-oxoxanthene produced by reacting 2-methyl-9-oxoxanthene with N-bromosuccinimide, 1,000 ml. of dioxane and 100 ml. of dimethylformamide, the mixture is heated with stirring, and the reaction mixture is poured into a large amount of water. The precipitate is collected by filtration, washed with water, dried, and recrystallized from a mixture of ethyl acetate and dioxane to give 60 g. of 2-cyanomethyl-9-oxoxanthene melting at 173°–176° C.

b. Sodium amide prepared in situ from 150 ml. of liquid ammonia and 1.27 g. of metallic sodium. To this is added 14 g. of ethyl 9-oxoxanthen-2-yl-acetate. After stirring the mixture for an hour, 100 ml. of toluene is added, and stirring is continued, allowing the ammonia to evaporate off. Then 8 g. of methyl iodide is gradually added at 25°–30° C. The resulting mixture is kept at 30° C. for 5 hours and then allowed to stand overnight. Water is added, and the toluene layer is separated and dried. The toluene is distilled off to leave 9 g. of ethyl α-(9-oxoxanthen-2-yl)propionate as an oil ($n_D^{19} = 1.6058$).

EXAMPLE 10

Preparation of Compound of Formula (III)

To a solution of 20 g. of xanthene in 200 ml. of tetrachloroethane plus 11.2 g. of acetic acid anhydride, there is added portionwise with stirring, 33 g. of anhydrous aluminum chloride. This mixture is maintained at 20°–25° C. for 4 hours, and then poured into ice water. The tetrachloroethane is distilled off from the organic layer, and the residue is distilled to give 10 g. of 2-acetylxanthene boiling at 170°–180° C.

EXAMPLE 11

Preparation of Compound of Formula (IV)

A mixture of 48 g. of methyl o-(p-tolyloxy)benzoate, 37 g. of N-bromosuccinimide, 0.5 g. of benzoyl peroxide and 200 ml. of carbon tetrachloride is refluxed for 4 hours. After cooling, the insolubles are filtered off, and the solvent is distilled off to give 66 g. of crude methyl o-(p-bromomethylphenoxy)benzoate.

To a solution of 17.5 g. of potassium cyanide in 30 ml. of water, there are added 300 ml. of dioxane, 50 ml. of dimethylformamide and 66 g. of said methyl o-(p-bromomethylphenoxy)benzoate, and the mixture is heated with stirring for 4 hours. The reaction mixture is poured into a large amount of water. Extraction with benzene, washing with water, drying and concentration give 50 g. of methyl o-(p-cyanomethylphenoxy)-benzoate boiling at 210°–220° C./0.1mmHg.

A mixture of 5 g. of said methyl o-(p-cyanomethylphenoxy)-benzoate, 20 ml. of concentrated hydrochloric acid and 30 ml. of glacial acetic acid is refluxed for 3 hours. The reaction mixture is concentrated. The crystals obtained are recrystallized from aqueous acetic acid to give 3 g. of p-(o-carboxyphenoxy)phenyl-acetic acid melting at 172°–175° C.

What is claimed is:

1. A compound of the formula:

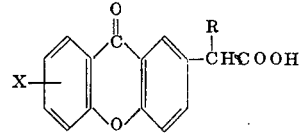

wherein R is a member selected from the group consisting of a hydrogen atom and a lower alkyl group and X is a member selected from the group consisting of a hydrogen atom, a lower alkyl group, and a halogen atom, and the pharmaceutically acceptable addition salts thereof.

2. A compound according to claim 1 having the name 9-oxoxanthen-2-yl-acetic acid.

3. A compound according to claim 1 which is the aluminum salt of 9-oxoxanthen-2-yl-acetic acid.

4. A compound according to claim 1 having the name 2-(9-oxoxanthen-2-yl)propionic acid.

* * * * *